Figure 1:
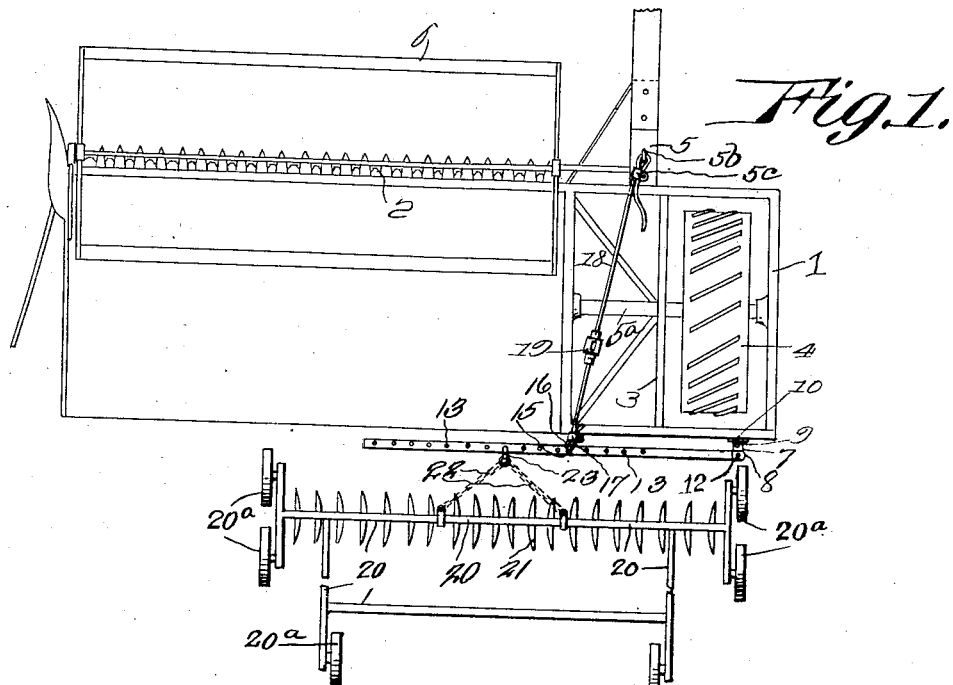

H. H. ROBERTS.
ATTACHMENT FOR BINDERS.
APPLICATION FILED FEB. 7, 1920.

1,349,855. Patented Aug. 17, 1920.

Inventor
Harry H. Roberts,
By Watson E. Coleman
Attorney

UNITED STATES PATENT OFFICE.

HARRY H. ROBERTS, OF CORWIN, KANSAS.

ATTACHMENT FOR BINDERS.

1,349,855.     Specification of Letters Patent.     Patented Aug. 17, 1920.

Application filed February 7, 1920. Serial No. 356,854.

*To all whom it may concern:*

Be it known that I, HARRY H. ROBERTS, a citizen of the United States, residing at Corwin, in the county of Harper and State of Kansas, have invented certain new and useful Improvements in Attachments for Binders, of which the following is a specification, reference being had to the accompanying drawings.

This invention relates to an attachment for wheel supported frames whereby soil working implements may be attached to the rear of said frame, for cutting or breaking up the soil or ground.

As a primary object it is the aim to provide an improved simple, efficient and practical device of this character capable of being manufactured for a relatively low cost and sold reasonably at an adequate remuneration.

Another object resides in the provision of the draw bar attached at one end to the rear part of the wheel supported frame and having a greater portion of its length beyond its attached end provided with means, whereby suitable soil working or cutting implements such as a series of disks may be attached, in combination with means connecting the end of the draw bar and the usual stub tongue of the wheel supported frame or other machine, whereby the draw bar is held in different positions.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figure 2:
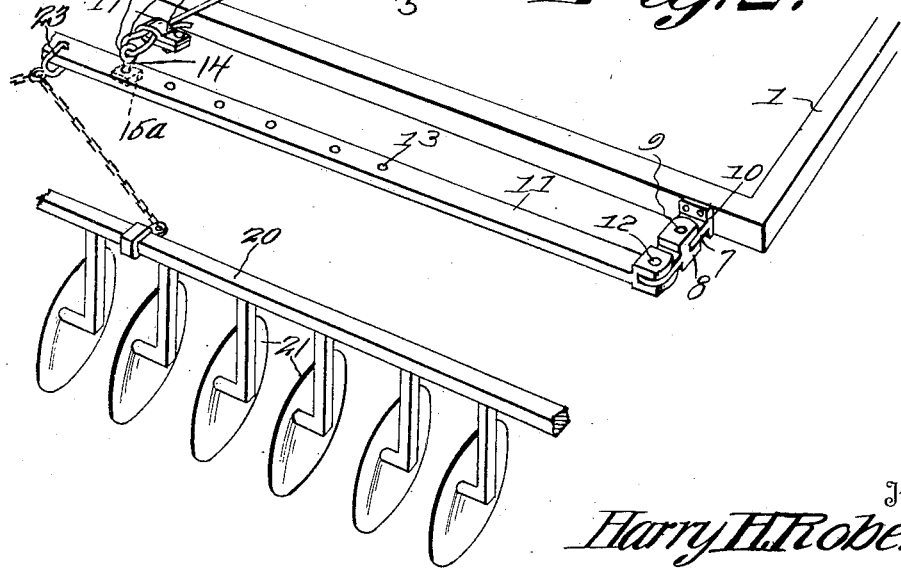

In the drawings:

Figure 1 is a plan view of a wheel supported frame showing the improved attachment as applied thereto and constructed in accordance with the invention; and Fig. 2 is an enlarged detail view of the attachment disconnected from the frame.

Referring more especially to these drawings 1 designates the frame which may be any suitable shape and constructed in any conventional manner, the same carrying the usual mowing means and also one of the supporting wheels, as indicated at 2 and 4. Extending forwardly from the frame 1 is a stub tongue 5 to which any suitable draft animals or other driving force may be connected. The supporting wheel 4 is mounted on the usual axle or shaft 5ª and supported on the frame is a conventional form of reel 6. Extending rearwardly from the rear part of the frame 1 is a lug or ear 7, which is mounted upon a plate 10 secured to the frame as shown. An elongated link 8 is pivotally connected at 9 to the lug or ear 7. A draw bar 11 is pivotally connected at 12 to the link 8. This draw bar, when used, assumes a horizontal position and may be adjusted parallel with the rear part of the frame 1 or at an angle thereto, and is provided with a plurality of apertures 13. A stub tongue 5 has an eye 5ᵇ and attached to the eye is a cable 18. The attaching of the cable to the eye is accomplished, by folding the cable to form a loop engaging the eye. A clamp 5ᶜ clamps the folded end and the body of the cable together as shown. A member 14 having an eye 15 is adapted to engage any one of the apertures or openings 13 of the draw bar, and is held therein by means of a nut 15ª. It is obvious that the member may be adjusted from one aperture or opening to another. The rear end of the cable 18 is inserted through the eye 15 of the member 14, and folded to form a loop 16. The folded end and the body of the cable are clamped detachably together by means of the clamp 17. The cable 18 comprises two sections, and the adjacent ends of the sections are adjustably connected by the turnbuckle attachment 19 in order to loosen or tension the cable, thereby additionally adjusting the draw bar with relation to the rear of the frame. A frame 20 carrying a plurality of soil cutting or working disks 21 is provided. This frame has a chain 22 connected to it, and the central portion of the chain carries a clevis 23, which may be adjusted in any one of the apertures 13 of the draw bar, that is to say any one of the apertures not used by the member 14. The soil working implement is only shown diagrammatically, in so far as its construction and its connections with the draw bar are concerned. It is to be understood, however, that this soil working machine may have any suitable means for holding it in an upright position, so that it can perform its work. It may be possible that this frame 20 can be mounted upon supporting wheels 20ª, so that the frame 20 may be held in a proper position.

It is obvious that the draw bar 11 may be adjusted, by lengthening or shortening the cable 18 so that the soil working machine may be held in different positions, either to cut into the soil straight, or at an angle to the line of travel of the machine. Any other means other than the chain 22 may be employed for connecting the soil working machine to the draw bar.

The invention having been set forth, what is claimed as new and useful is:

1. The combination with a wheel supported frame, of an implement at the rear thereof, a drawbar operatively pivoted on the rear of said frame offset in a plane to one side of the draft tongue of said frame, a clevis adjustably and operatively connected to the drawbar and having diverging chain connections with said implement, a cable having its forward end adjustably connected to the forward part of the frame, and its rear end adjustably and operatively connected to said drawbar, said cable comprising two sections, and means connecting the adjacent ends of the sections for adjusting the drawbar with respect to the rear of the frame.

2. The combination with a wheel supported frame, of an implement positioned to the rear of said frame, a drawbar operatively pivoted to the rear of said frame in a plane offset to one side of the draft tongue of the frame, said drawbar being adjustable pivotally, whereby it may assume relative angles to the rear of the frame, a device connected to the implement and being adjustably and operatively connected to said drawbar, a pliable connection adjustably connected at its forward end to said frame and having its rear end adjustably and operatively connected to the drawbar, whereby the drawbar may be adjusted at relative angles with respect to the rear of the frame.

3. The combination with a wheel supported frame, of a drawbar operatively pivoted to the rear of the frame in a plane to one side of the line of draft of said frame, whereby the drawbar may assume relative angles with respect to the frame, a clevis adjustably and operatively connected to and mounted upon the drawbar and adapted for connection to an implement, whereby the implement may be adjusted laterally and rearwardly to different positions relative to the plane, and a pliable connection having one end adjustably and operatively connected to the drawbar, whereby the drawbar may be adjustably pivotally to assume relative angles with respect to the frame, the forward end of the pliable connection being connected to the forward part of the frame.

4. In an appliance of the kind set forth, a pair of wheel supported frames relatively positioned, one in advance of the other, a drawbar operatively pivoted to the frame in advance of a plane to one side of the line of draft and adapted to assume relative angles with respect to the advanced frame, flexible means connected to the frame in the rear, and having a device adjustably and operatively connected to said drawbar, said drawbar having a plurality of openings, a pliable connection adjustably and operatively connected to any one of said openings of the drawbar, either in a plane offset to one side, or positioned directly to the rear of the line of draft, for holding the drawbar at relatively different angles with respect to the frame in advance, said pliable connection having its forward end adjustably and operatively connected to the forward part of the frame, said pliable connection comprising two sections, and means adjustably and operatively connecting the two sections.

In testimony whereof I hereunto affix my signature.

HARRY H. ROBERTS.